(12) United States Patent
Voggenthaler

(10) Patent No.: US 11,524,191 B2
(45) Date of Patent: Dec. 13, 2022

(54) HELICOPTER DRIZZLE PIPE

(71) Applicant: Susan Voggenthaler, Carson City, NV (US)

(72) Inventor: Susan Voggenthaler, Carson City, NV (US)

( * ) Notice: Subject to any disclaimer, the term of this patent is extended or adjusted under 35 U.S.C. 154(b) by 97 days.

(21) Appl. No.: 17/032,262

(22) Filed: Sep. 25, 2020

(65) Prior Publication Data

US 2022/0096882 A1 Mar. 31, 2022

(51) Int. Cl.
| | | |
|---|---|---|
| *A62C 3/02* | (2006.01) | |
| *B64D 1/18* | (2006.01) | |
| *B05B 1/26* | (2006.01) | |
| *B05B 1/20* | (2006.01) | |

(52) U.S. Cl.
CPC .............. *A62C 3/0242* (2013.01); *B05B 1/20* (2013.01); *B05B 1/262* (2013.01); *B64D 1/18* (2013.01)

(58) Field of Classification Search
CPC ...... A62C 3/0242; A62C 3/0228; B64D 1/18; B05B 1/20; B05B 1/26; B05B 1/262; B05B 1/265; B05B 1/267
USPC .......... 169/53; 239/171, 500, 502, 521, 548, 239/550, 566
See application file for complete search history.

(56) References Cited

U.S. PATENT DOCUMENTS

| | | | | | |
|---|---|---|---|---|---|
| 2,979,273 | A | * | 4/1961 | Liebhart | B64D 1/16 239/550 |
| 3,445,065 | A | * | 5/1969 | Waldrum | B64D 1/16 239/171 |
| 5,188,293 | A | * | 2/1993 | Burton | B60S 3/04 239/548 |
| 6,003,782 | A | * | 12/1999 | Kim | B64D 1/18 169/53 |
| 2006/0102213 | A1 | * | 5/2006 | Kopp | B08B 3/02 239/589 |
| 2013/0174878 | A1 | * | 7/2013 | Seo | B08B 3/022 239/548 |
| 2018/0111135 | A1 | * | 4/2018 | Zito, Jr. | B05B 1/24 |
| 2018/0194464 | A1 | * | 7/2018 | Elder | B64D 1/18 |
| 2019/0084679 | A1 | * | 3/2019 | Falder | B64D 45/00 |

FOREIGN PATENT DOCUMENTS

KR 101964016 B1 * 3/2019

* cited by examiner

*Primary Examiner* — Steven J Ganey
(74) *Attorney, Agent, or Firm* — Lyman Moulton, Esq.; Moulton Patents, PLLC

(57) ABSTRACT

The helicopter drizzle pipe allows for aerial wildfire suppression efforts in otherwise inaccessible areas. The pipe is balanced between the bottom legs of the helicopter as to prevent an imbalance or obstruction to the helicopter rotor blades. Along the bottom of the pipe are strategically placed holes to allow the liquid in the pipe to drizzle out at a constant speed over the whole length of the pipe, simulating rainfall. Due to the pipe's positioning, it is also very easy to remove from the helicopter for refilling or cleaning. Furthermore, the method by which the liquid drizzles from the pipe does not necessitate aircraft movement, thus functioning even when the helicopter hovers to thoroughly cover a specific area.

14 Claims, 9 Drawing Sheets

```
100 ─┐  defining orifices in a water pipe array of a plurality of pipe for an
     └─ egress of water therefrom 110 ─┐  attaching an enhancement adjacent each of the defined orifices, each
     └─ enhancement configured to create a drizzle drop egress of the water 120 ─┐  configuring a water tank in a supply communication with the water
     └─ pipe array, the water tank configured to attach to an aerial vehicle 130 ─┐  setting low durometer grommets of various diameters in each orifice
     └─ configured to generate a plurality of drizzle drops to various sizes 140 ─┐  creating a suction at each orifice based on an airflow across a pipette
     └─ set in each orifice 150 ─┐  directing an airflow across each orifice via fins disposed between
     └─ each orifice, the fins configured to induce the drizzle drop egress
```

FIG. 9

HELICOPTER DRIZZLE PIPE

BACKGROUND

A wildfire is an uncontrolled fire in an area of combustible dry vegetation occurring in rural areas. Wildfires can be characterized in terms of the cause of ignition, their physical properties, the combustible material present, and the effect of weather on the fire. Wildfires can cause damage to property and human life, although naturally occurring wildfires may have beneficial effects on native vegetation, animals, and ecosystems that have evolved with fire. There have been no products available as original equipment or as an aftermarket to prevent and address this problem.

Wildfire suppression depends on irrigation and technologies available in the area in which the wildfire occurs. Silver iodide can be used to encourage snow fall, while fire retardants and water can be dropped onto fires by unmanned aerial vehicles, planes, and helicopters. Complete fire suppression is no longer an expectation, but the majority of wildfires are often preventable or extinguished before they grow out of control. There have been no products available as original equipment or as an aftermarket to address this problem either.

There exists a need for an aircraft delivered irrigation and fire suppression that is not being met by any known or disclosed device or system of present.

SUMMARY OF THE INVENTION

The helicopter drizzle pipe allows for aerial wildfire suppression efforts by irrigation in otherwise inaccessible areas. The pipe is balanced between the bottom legs of the helicopter as to prevent an imbalance or obstruction to the helicopter rotor blades. Along the bottom of the pipe are strategically placed holes to allow the liquid in the pipe to drizzle out at a constant speed over the whole length of the pipe, simulating rainfall. Due to the pipe's positioning, it is also very easy to remove from the helicopter for refilling or cleaning. Furthermore, the method by which the liquid drizzles from the pipe does not necessitate aircraft movement, thus functioning even when the helicopter hovers to thoroughly cover a specific area.

BRIEF DESCRIPTION OF THE DRAWINGS

FIG. 9 is a method of irrigation and fire suppression via a drizzle pipe array attached to an aerial vehicle in accordance with an embodiment of the present disclosure.

Figure 1:
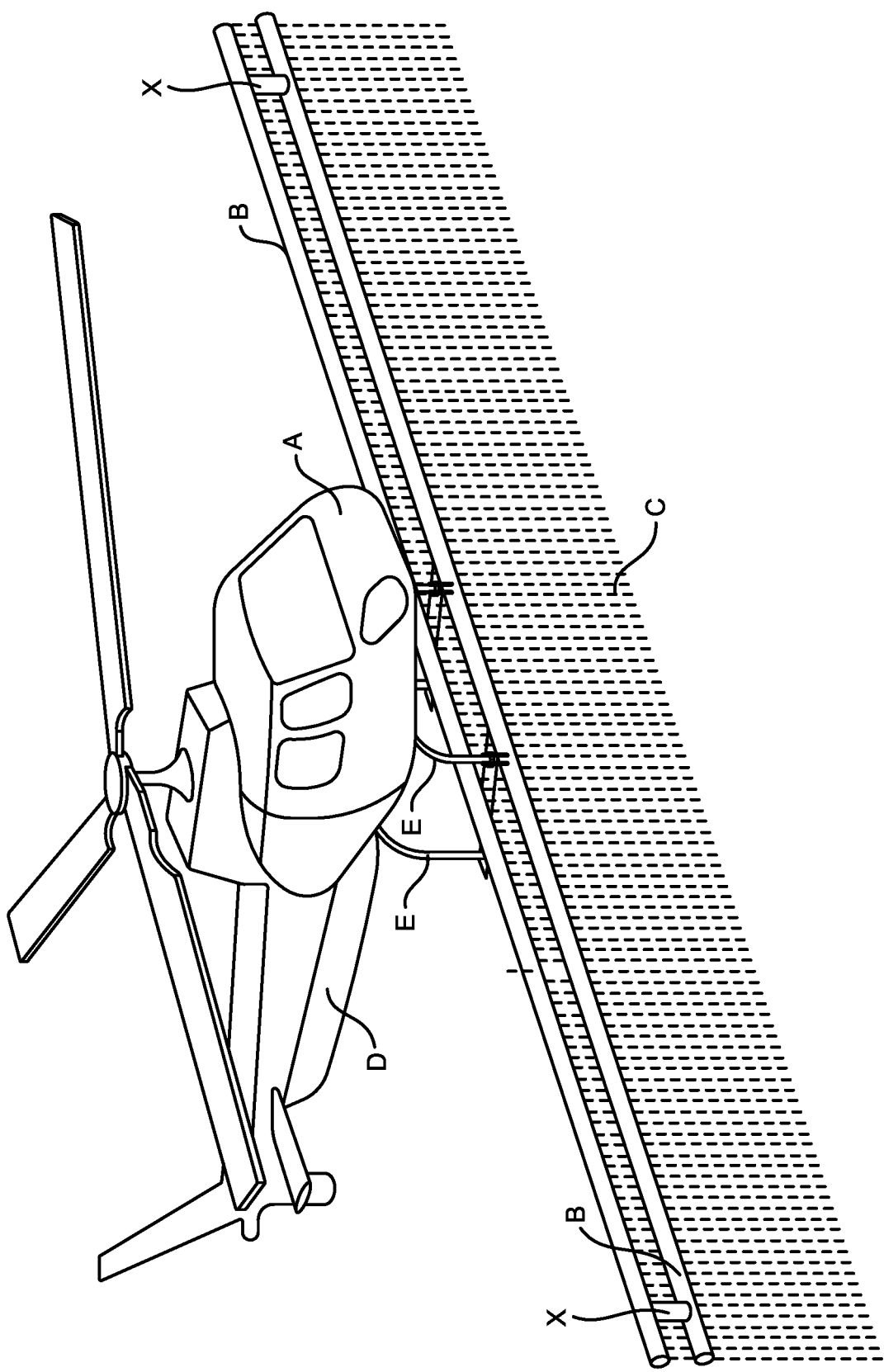
FIG. 1 is a view of the helicopter drizzle pipe array in use while attached to the bottom of a helicopter in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure the term [term] is used to refer to [describe, rest of sentence]. The term [term] refers to [describe, rest of sentence].

FIG. 1 is a view of the helicopter drizzle pipe in use while attached to the bottom of a helicopter in accordance with an embodiment of the present disclosure. The helicopter A bears the drizzle pipe B between the bottom legs on the underbelly. This allows for unobstructed liquid flow. The liquid drizzling C from the pipe B can be used to irrigate and suppress wildfires in otherwise inaccessible areas. The water supply tank D is in a supply communication with the water pipe array of pipe B and cross member pipes X via supply structure lines E.

Figure 2:
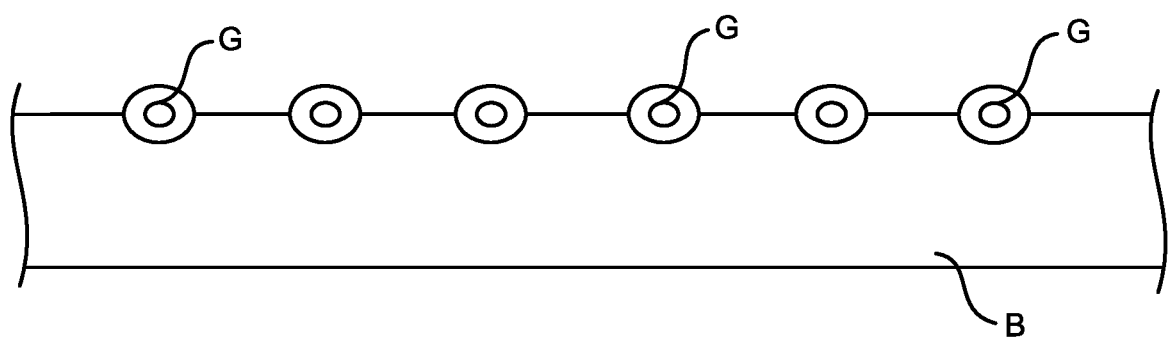
FIG. 2 is a detail of the grommet drizzle orifices of the drizzle pipe in accordance with an embodiment of the present disclosure.

FIG. 2 is a detail of the grommet drizzle orifices of the drizzle pipe in accordance with an embodiment of the present disclosure. The grommets G are of various sizes according to the various sizes of the orifices in the drizzle pipes B of the pipe array. The various size orifices and various size grommets produce drizzle drops of various sizes to simulate natural rain fall. The drizzle pipe and pipe array are oriented with drizzle orifices upward to the sky and also downward to the ground depending on rainfall intensity desired in application.

Figure 3:
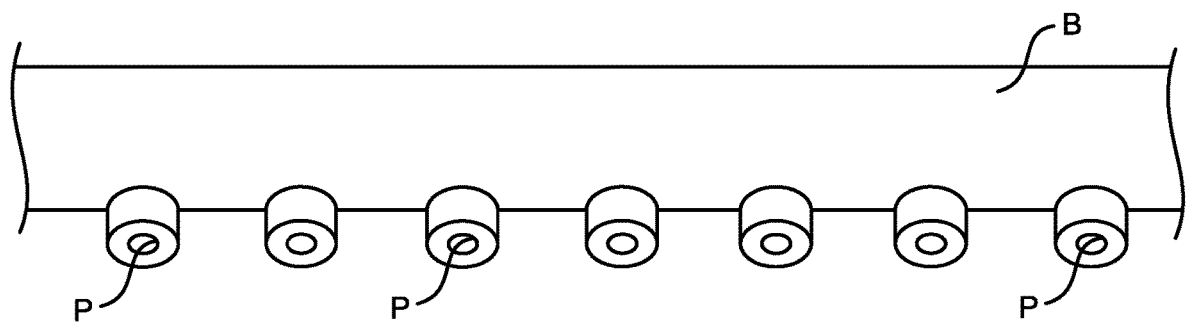
FIG. 3 is a detail of the pipette drizzle orifices of the drizzle pipe in accordance with an embodiment of the present disclosure.

FIG. 3 is a detail of the pipette drizzle orifices of the drizzle pipe in accordance with an embodiment of the present disclosure. The pipettes P are set in the drizzle orifices of the drizzle pipe B so that an airflow across each pipette creates a suction of water or fluid out the pipette opening.

Figure 4:
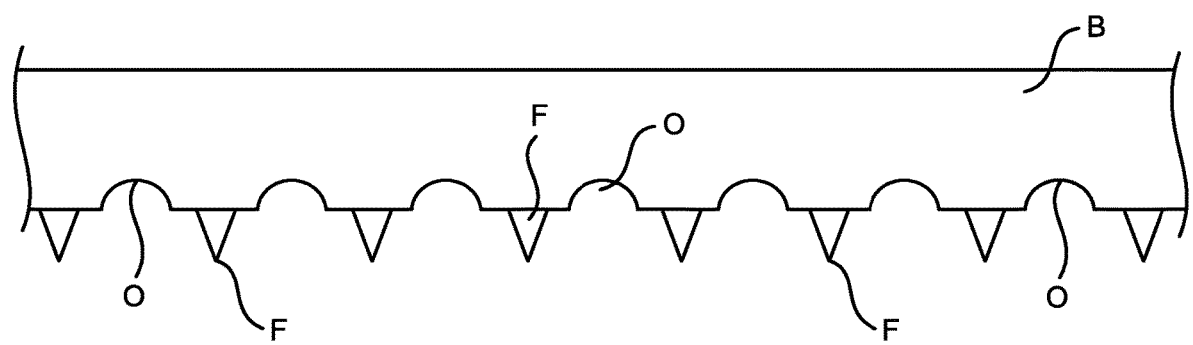
FIG. 4 is a detail of the fins adjacent the drizzle orifices of the drizzle pipe in accordance with and embodiment of the present disclosure.

FIG. 4 is a detail of the fins adjacent the drizzle orifices of the drizzle pipe in accordance with and embodiment of the present disclosure. The fins F direct an airflow across the drizzle orifices O to draw out a fluid from the drizzle pipe B in drizzle droplets. The fins F are attached adjacent the drizzle orifices O and are also formed in the drizzle pipe at a time of manufacture according to design and engineering parameters in embodiments of the disclosure.

Figure 5:
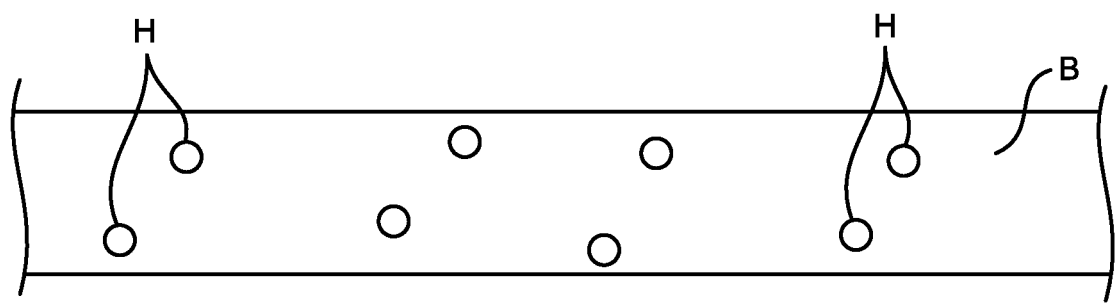
FIG. 5 is a detail of the helical pattern drizzle orifices of the drizzle pipe in accordance with an embodiment of the present disclosure.

FIG. 5 is a detail of the helical pattern drizzle orifices of the drizzle pipe in accordance with an embodiment of the present disclosure. The helical pattern drizzle orifices H are spaced apart equidistantly and sporadically on the drizzle pipe B according to design and engineering constraints to produce a natural pattern of drizzle rain fall from the pipe array.

Figure 6:
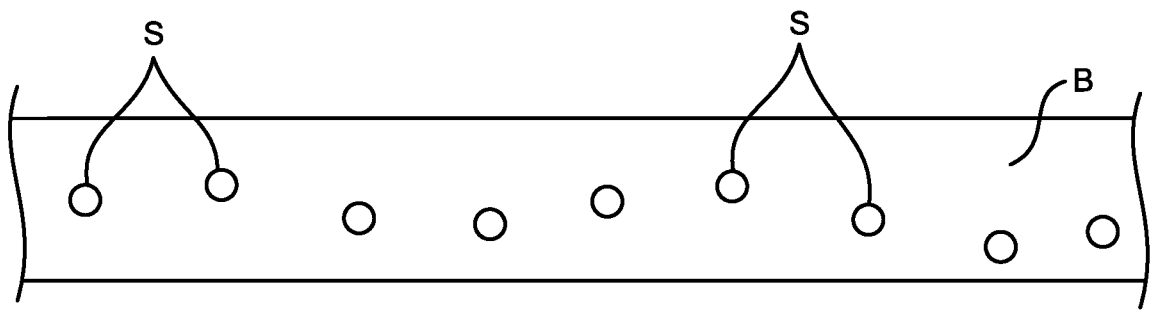
FIG. 6 is a detail of the serpentine drizzle pattern orifices of the drizzle pipe in accordance with an embodiment of the present disclosure.

FIG. 6 is a detail of the serpentine drizzle pattern orifices of the drizzle pipe in accordance with an embodiment of the present disclosure. The serpentine pattern drizzle orifices S are spaced apart equidistantly and sporadically on the drizzle pipe B according to design and engineering constraints to produce a natural pattern of drizzle rain fall from the pipe array.

Figure 7:
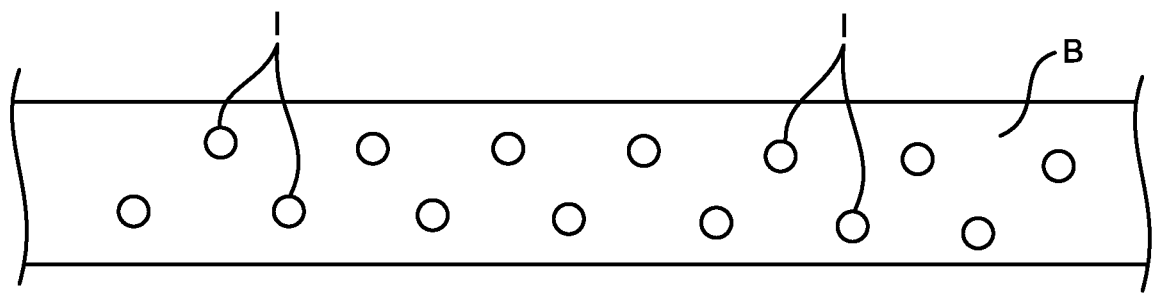
FIG. 7 is a detail of the interleaved drizzle pattern orifices of the drizzle pipe in accordance with an embodiment of the present disclosure.

FIG. 7 is a detail of the interleaved drizzle pattern orifices of the drizzle pipe in accordance with an embodiment of the present disclosure. The interleaved pattern drizzle orifices I are spaced apart equidistantly and sporadically on the drizzle pipe B according to design and engineering constraints to produce a natural pattern of drizzle rain fall from the pipe array.

Figure 8:
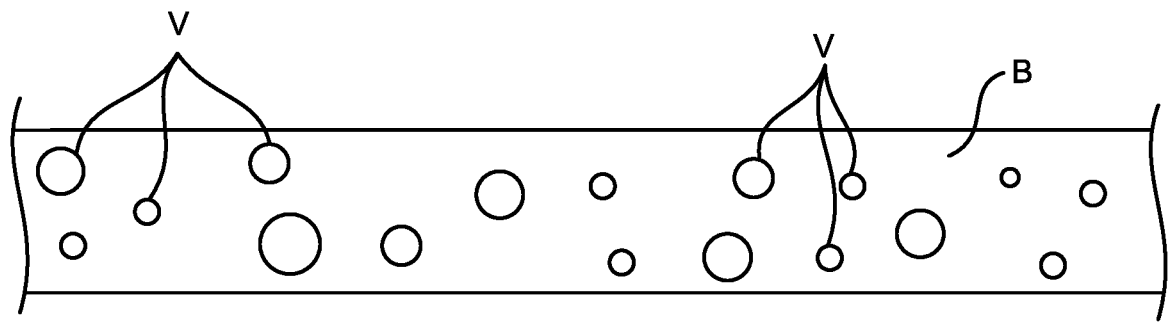
FIG. 8 is a detail of the random placement and various diameter drizzle pattern orifices of the drizzle pipe in accordance with an embodiment of the present disclosure.

FIG. 8 is a detail of the random placement and various diameter drizzle pattern orifices of the drizzle pipe in accordance with an embodiment of the present disclosure. The random placement and various pattern drizzle orifices V are spaced apart equidistantly and sporadically on the drizzle pipe B according to design and engineering constraints to produce a natural pattern of drizzle rain fall from the pipe array.

FIG. 9 is a method of irrigation and fire suppression via a drizzle pipe array attached to an aerial vehicle in accordance with an embodiment of the present disclosure. The method includes defining 100 orifices in a water pipe array of a plurality of pipe for an egress of the water therefrom. The method also includes attaching 110 an enhancement adjacent each of the defined orifices, each enhancement configured to create a drizzle drop egress of the water. The method additionally includes configuring 120 a water tank in a supply communication with the water pipe array, the water tank configured to attach to an aerial vehicle.

Embodiments of the method include setting 130 low durometer grommets of various diameters in each orifice configured to generate a plurality of drizzle drops of various sizes. Embodiments of the method also include creating 140 a suction at each orifice based on an airflow across a pipette set in each orifice. Embodiments of the method further include directing 150 an airflow across each orifice via fins disposed between each orifice, the fins configured to induce the drizzle drop egress.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A fluid distribution device comprising:
   a fluid pipe array defining orifices therein for an egress of a fluid therefrom;
   an enhancement attached adjacent each of the defined orifices, each enhancement configured to create a drizzle drop egress of the fluid;
   a fluid tank in a supply communication with the fluid pipe array, the fluid tank configured to attach to an aerial vehicle; and
   wherein the enhancements comprise fins disposed between each orifice, the fins configured to direct an airflow across each orifice to generate the drizzle drop egress.

2. The device of claim 1, wherein the fluid pipe array comprises a rectilinear structure of fluid pipe including parallel members and cross members.

3. The device of claim 1, wherein the fluid pipe array comprises two or more pipe configured parallel to one another on the aerial vehicle.

4. The device of claim 1, wherein the fluid pipe array comprises at least one pipe configured orthogonal to a forward travel of the aerial vehicle.

5. The device of claim 1, wherein the defining orifices are equidistantly spaced apart on a lateral dimension of each pipe of the fluid pipe array.

6. The device of claim 1, wherein the defining orifices are sporadically spaced apart on a circumference of each pipe of the fluid pipe array.

7. The device of claim 1, wherein the defining orifices are sporadically spaced apart on a spiral configuration around each pipe of the fluid pipe array.

8. The device of claim 1, wherein the orifices defined in the fluid pipe array comprise a variety of diameters.

9. The device of claim 1, wherein the orifices are predefined in a serpentine geometry on a lateral dimension of the fluid pipe array.

10. The device of claim 1, wherein the orifices are predefined in interleaved rows on a lateral dimension of the fluid pipe array.

11. The device of claim 1, wherein the fluid tank is in a gravity pressure supply communication with the fluid pipe array.

12. The device of claim 1, wherein the fluid tank is in a pump pressure supply communication with the fluid pipe array.

13. A water distribution system comprising:
    a water pipe array of a plurality of pipe defining orifices therein for an egress of the water therefrom;
    an enhancement attached adjacent each of the defined orifices, each enhancement configured to create a drizzle drop egress of the water;
    a water tank in a supply communication with the water pipe array, the water tank configured to attach to an aerial vehicle; and
    wherein the enhancements comprise fins disposed between each orifice, the fins configured to direct an airflow across each orifice to generate the drizzle drop egress.

14. A water distribution method comprising:
    defining orifices in a water pipe array of a plurality of pipe for an egress of the water therefrom;
    attaching an enhancement adjacent each of the defined orifices, each enhancement configured to create a drizzle drop egress of the water;
    configuring a water tank in a supply communication with the water pipe array, the water tank configured to attach to an aerial vehicle; and directing an airflow across each orifice via the enhancements which comprise fins disposed between each orifice, the fins configured to induce the drizzle drop egress.

\